United States Patent
Luo

(10) Patent No.: US 10,805,363 B2
(45) Date of Patent: Oct. 13, 2020

(54) METHOD, DEVICE AND SYSTEM FOR PUSHING FILE

(71) Applicant: Tencent Technology (Shenzhen) Company Limited, ShenZhen, Guangdong (CN)

(72) Inventor: Ruhai Luo, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 292 days.

(21) Appl. No.: 15/663,494

(22) Filed: Jul. 28, 2017

(65) Prior Publication Data
US 2017/0331867 A1    Nov. 16, 2017

Related U.S. Application Data

(63) Continuation of application No. PCT/CN2016/081652, filed on May 11, 2016.

(30) Foreign Application Priority Data

Jun. 17, 2015  (CN) .......................... 2015 1 0336360

(51) Int. Cl.
*G06F 15/16*  (2006.01)
*H04L 29/06*  (2006.01)
(Continued)

(52) U.S. Cl.
CPC ........ *H04L 65/4023* (2013.01); *G06F 16/183* (2019.01); *H04L 29/08* (2013.01);
(Continued)

(58) Field of Classification Search
CPC .. H04L 67/26; H04L 65/4023; H04L 65/4061
(Continued)

(56) References Cited

U.S. PATENT DOCUMENTS

| 9,917,884 B2* | 3/2018 | Zhang | H04L 67/26 |
| 2006/0179153 A1* | 8/2006 | Lee | H04L 67/32 |
| | | | 709/231 |

(Continued)

FOREIGN PATENT DOCUMENTS

| CN | 1813251 A | 8/2006 |
| CN | 101453717 A | 6/2009 |

(Continued)

OTHER PUBLICATIONS

Office Action Issued with Summary Translation for Chinese Application No. 201510336360.3 dated Nov. 3, 2017.

(Continued)

*Primary Examiner* — Bharat Barot
(74) *Attorney, Agent, or Firm* — Knobbe, Martens, Olson & Bear, LLP

(57) ABSTRACT

A method, a device and a system for pushing a file are provided. In some embodiments, the method includes: splitting a data file to be pushed into multiple sub-files; uploading the multiple sub-files in parallel to a file storage node; and adding a push task corresponding to the multiple sub-files into a coordinator node. When it is detected that the push task is added into the coordinator node, a slave push node downloads the multiple sub-files in parallel from the file storage node, merges the multiple downloaded sub-files, and pushes a data file obtained by the merging to a destination node upon receipt of a scheduling instruction from the master push node. The solutions shorten the time taken to upload the data file and the time taken to download the data file, and improve the push efficiency.

14 Claims, 8 Drawing Sheets

(51) Int. Cl.
  *G06F 16/182* (2019.01)
  *H04L 29/08* (2006.01)
(52) U.S. Cl.
  CPC .......... *H04L 65/4061* (2013.01); *H04L 65/80* (2013.01); *H04L 67/06* (2013.01); *H04L 67/26* (2013.01); *H04L 67/32* (2013.01)
(58) Field of Classification Search
  USPC .................. 709/217–219, 227–229, 232–232
  See application file for complete search history.

(56) References Cited

U.S. PATENT DOCUMENTS

| | | | | |
|---|---|---|---|---|
| 2008/0069091 | A1* | 3/2008 | Cohen | H04L 67/34 370/389 |
| 2010/0136959 | A1* | 6/2010 | Kim | H04L 67/2823 455/414.4 |
| 2010/0257273 | A1* | 10/2010 | Mutikainen | H04L 65/1086 709/227 |
| 2010/0257573 | A1* | 10/2010 | Li | H04L 67/2842 725/118 |
| 2015/0244757 | A1 | 8/2015 | Zhuang et al. | |
| 2018/0293111 | A1* | 10/2018 | Chen | H04L 67/2842 |

FOREIGN PATENT DOCUMENTS

| | | |
|---|---|---|
| CN | 102130928 A | 7/2011 |
| CN | 102456076 A | 5/2012 |
| CN | 103237049 A | 8/2013 |
| CN | 104092719 A | 10/2014 |
| CN | 104967619 A | 10/2015 |
| CN | 105338424 A | 2/2016 |
| WO | WO 2014/082505 A1 | 6/2014 |

OTHER PUBLICATIONS

International Search Report for International Application No. PCT/CN2016/081652 dated Jul. 22, 2016 in 2 pages.

* cited by examiner

METHOD, DEVICE AND SYSTEM FOR PUSHING FILE

CROSS REFERENCE TO RELATED APPLICATION

The present application is a continuation of International Application No. PCT/CN2016/081652, filed on May 11, 2016, which claims the priority to Chinese Patent Application No. 201510336360.3, titled "METHOD, DEVICE AND SYSTEM FOR PUSHING FILE", filed on Jun. 17, 2015 with the State Intellectual Property Office of the People's Republic of China, both of which are incorporated herein by reference in entireties.

TECHNICAL FIELD

The present disclosure relates to the field of network technology, and in particular to a method, a device and a system for pushing a file.

BACKGROUND

With the rapid development of Internet technology, the size of data of a network system has become increasingly big, and more and more data files are generated. When a new data file is generated, how to quickly push the generated data file to a destination node where the data file needs to be applied has become an urgent problem to be solved.

In a current network system, when obtaining a data file, a client uploads the data file to a file storage node, and submits a push task to a coordinator node after the uploading is completed. Based on the push task, the coordinator node may determine a destination node corresponding to the push task, i.e., the destination node of the data file. A slave push node monitors tasks in the coordinator node, determines a destination node of the data file when it is detected that the push task is added into the coordinator node, and downloads the data file from the file storage node. After the downloading is completed, the slave push node enters into a downloading ready state and waits for a scheduling instruction from a master push node. When it is detected that the push task is added into the coordinator node, the master push node determines a destination node of the data file, and determines whether the destination node is in an idle state. If the master push node determines that the destination node is in an idle state, and a slave push node is in the download ready state, the master push node sends the scheduling instruction to the slave push node, and the slave push node pushes the data file to the destination node upon receipt of the a scheduling instruction.

In the process of implementing the conventional technology, the inventor has found that there are at least the following problems in the conventional technology.

It takes a long time for a client to upload a data file to a file storage node, and it also takes a long time for a slave push node to download the data file from the file storage node.

SUMMARY

To solve the problems in the conventional technology, a method, a device and a system for pushing a file are provided according to embodiments of the present disclosure. The technical solutions are described below.

A method for pushing a file is provided in a first aspect, and the method includes:

splitting a data file to be pushed into multiple sub-files;

uploading the multiple sub-files in parallel to a file storage node; and adding a push task corresponding to the multiple sub-files into a coordinator node, where when it is detected that the push task is added into the coordinator node, a slave push node downloads the multiple sub-files in parallel from the file storage node, merges the multiple downloaded sub-files, and pushes a data file obtained by the merging to a destination node upon receipt of a scheduling instruction.

A method for pushing a file is provided in a second aspect, and the method includes:

monitoring tasks in a coordinator node;

determining a destination node corresponding to a push task, when it is detected that the push task is added into the coordinator node;

downloading multiple sub-files corresponding to the push task in parallel from a file storage node, where the multiple sub-files are obtained by a client by splitting a data file to be pushed;

merging the multiple downloaded sub-files; and pushing a data file obtained by the merging to the destination node upon receipt of a scheduling instruction.

A method for pushing a file is provided in a third aspect, and the method includes:

monitoring tasks in a coordinator node;

determining a destination node corresponding to a push task, when it is detected that the push task is added into the coordinator node;

judging whether the destination node is in an idle state; and sending, in a case that it is determined that the destination node is in an idle state, a scheduling instruction to a slave push node without determining a downloading progress of the slave push node, to instruct the slave push node to push a data file to the destination node upon receipt of the scheduling instruction, where the data file is obtained by the slave push node by downloading multiple sub-files corresponding to the push task and merging the multiple downloaded sub-files.

A method for pushing a file is provided in a fourth aspect, and the method includes:

splitting, by a client, a data file to be pushed into multiple sub-files, uploading the multiple sub-files in parallel to a file storage node, and adding a push task corresponding to the multiple sub-files into a coordinator node;

monitoring, by a slave push node, tasks in the coordinator node, determining a destination node corresponding to the push task when it is detected that the push task is added into the coordinator node, downloading the multiple sub-files in parallel from the file storage node, and merging the multiple downloaded sub-files;

monitoring, by a master push node, the tasks in the coordinator node, determining the destination node corresponding to the push task when it is detected that the push task is added into the coordinator node, judging whether the destination node is in an idle state, and sending, in a case that it is determined that the destination node is in an idle state, a scheduling instruction to the slave push node without determining a downloading progress of the slave push node; and pushing, by the slave push node, a data file obtained by the merging to the destination node upon receipt of the scheduling instruction.

A device for pushing a file is provided in a fifth aspect, and the device includes:

a splitting module configured to split a data file to be pushed into multiple sub-files;

a parallel uploading module configured to upload the multiple sub-files in parallel to a file storage node; and a task adding module configured to add a push task corresponding to the multiple sub-files into a coordinator node, where when it is detected that the push task is added into the coordinator node, a slave push node downloads the multiple sub-files in parallel from the file storage node, merges the multiple downloaded sub-files, and pushes a data file obtained by the merging to a destination node upon receipt of a scheduling instruction.

A device for pushing a file is provided in a sixth aspect, and the device includes:

a monitoring module configured to monitor tasks in a coordinator node;

a determining module configured to determine a destination node corresponding to a push task, when it is detected that the push task is added into the coordinator node;

a parallel downloading module configured to download multiple sub-files corresponding to the push task in parallel from a file storage node, where the multiple sub-files is obtained by a client by splitting a data file to be pushed;

a merging module configured to merge the multiple downloaded sub-files; and a pushing module configured to push a data file obtained by the merging to the destination node upon receipt of a scheduling instruction.

A device for pushing a file is provided in a seventh aspect, and the device includes:

a monitoring module configured to monitor tasks in a coordinator node;

a determining module configured to determine a destination node corresponding to a push task, when it is detected that the push task is added into the coordinator node;

a judging module configured to judge whether the destination node is in an idle state; and a sending module configured to send, in a case that it is determined that the destination node is in an idle state, a scheduling instruction to a slave push node without determining a downloading progress of the slave push node, to instruct the slave push node to push a data file to the destination node upon receipt of the scheduling instruction, where the data file is obtained by the slave push node by downloading multiple sub-files corresponding to the push task and merging the multiple downloaded sub-files.

A system for pushing a file is provided in an eighth aspect. The system includes: a client, a master push node, a slave push node, a file storage node, a coordinator node and a destination node.

The client is configured to split a data file to be pushed into multiple sub-files, upload the multiple sub-files in parallel to the file storage node, and add a push task corresponding to the multiple sub-files into the coordinator node.

The slave push node is configured to monitor tasks in the coordinator node, determine a destination node corresponding to the push task when it is detected that the push task is added into the coordinator node, download the multiple sub-files corresponding to the push task in parallel from the file storage node, and merge the multiple downloaded sub-files.

The master push node is configured to monitor the tasks in the coordinator node, determine the destination node corresponding to the push task when it is detected that the push task is added into the coordinator node, judge whether the destination node is in an idle state, and send, in a case that it is determined that the destination node is in an idle state, a scheduling instruction to the slave push node without determining a downloading progress of the slave push node.

The slave push node is further configured to push a data file obtained by the merging to the destination node upon receipt of the scheduling instruction.

The technical solutions according to the embodiments of the present disclosure have the following beneficial effects.

Based on the method, the device and the system according to the embodiments of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved.

BRIEF DESCRIPTION OF THE DRAWINGS

To illustrate technical solutions according to embodiments of the present disclosure more clearly, drawings to be used in the descriptions of the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

Technical solutions of the embodiments of the present disclosure are illustrated clearly and completely in conjunction with the following drawings of the embodiments of the disclosure. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

Figure 1:
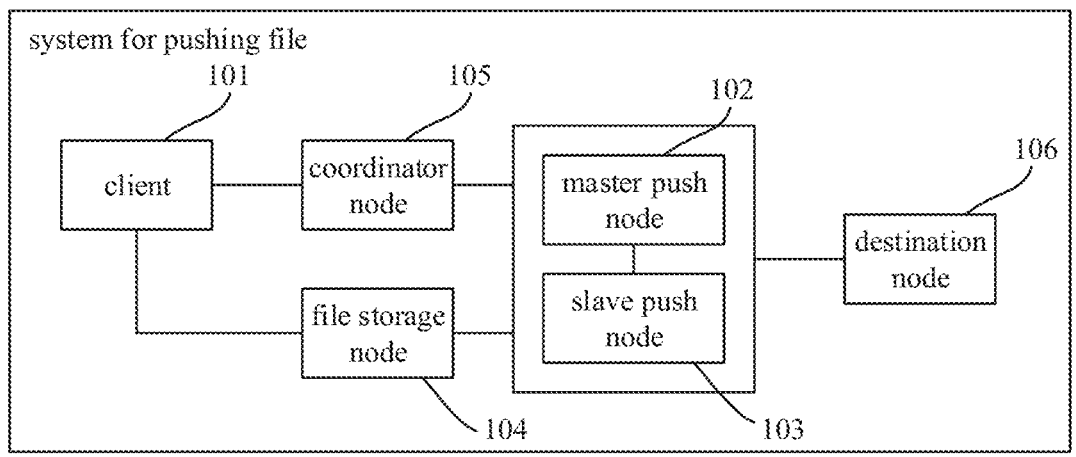
FIG. 1 is a schematic structural diagram of a system for pushing a file according to an embodiment of the present disclosure.

FIG. 1 is a schematic structural diagram of a system for pushing a file according to an embodiment of the present disclosure. Reference is made to FIG. 1. The system for pushing a file includes a client 101, a master push point 102, a slave push point 103, a file storage node 104, a coordinator node 105 and a destination node 106. The client 101 is connected to the file storage node 104 and the coordinator node 105, respectively. The coordinator node 105 is connected to the master push point 102 and the slave push point 103, respectively. The master push point 102 is connected to the slave push point 103, and both the master push point 102 and the slave push point 103 are connected to the destination node 106.

For a data file, the client 101 is configured to upload the data file to the file storage node 104 and submit a push task corresponding to the data file in the coordinator node 105. The master push node 102 and the slave push node 103 are configured to monitor tasks in the coordinator node 105. The master push node 102 is further configured to monitor an operating state of the destination node 106, and schedule the slave push node 103 when it is detected that the push task is added into the coordinator node and that the destination node 106 is in an idle state. The slave push node 103 is configured to, when it is detected that the push task is added into the coordinator node, download the data file from the file storage node 104, and push the data file to the destination node 106 according to the schedule of the master push node 102.

In an embodiment of the present disclosure, the client 101 is configured to split a data file to be pushed into multiple sub-files, upload the multiple sub-files in parallel to the file storage node 104, and add a push task corresponding to the multiple sub-files into the coordinator node 105.

The slave push node 103 is configured to monitor tasks in the coordinator node 105, determine a destination node 106 corresponding to a push task when it is detected that the push task is added into the coordinator node 105, download the multiple sub-files corresponding to the push task in parallel from the file storage node 104, and merge the multiple downloaded sub-files.

The master push node 102 is configured to monitor tasks in the coordinator node 105, determine a destination node 106 corresponding to a push task when it is detected that the push task is added into the coordinator node 105, judge whether the destination node 106 is in an idle state, and send, in a case that it is determined that the destination node 106 is in an idle state, a scheduling instruction to the slave push node 103 without determining a state of the slave push node 103.

The push node 103 is further configured to push a data file obtained by the merging to the destination node 106 upon receipt of the scheduling instruction.

It should be noted that, the file storage node in the embodiment of the present disclosure may be a simple file storage node, or a file storage node cluster which includes multiple file storage nodes, and the coordinator node in the embodiment of the present disclosure may be a simple coordinator node, or a coordinator node cluster which includes multiple coordinator nodes, which are not limited in the embodiment of the present disclosure.

Optionally, the client 101 is further configured to upload the multiple sub-files in parallel to a specified directory of the file storage node 104. The slave push node 103 is further configured to download the multiple sub-files in parallel from the specified directory.

Optionally, the client 101 is further configured to create an uploading sub-task for each of the multiple sub-files. Each uploading sub-task includes a name of a corresponding sub-file. The client 101 is further configured to upload the multiple sub-files in parallel to the file storage node 104, based on the multiple created uploading sub-tasks.

Optionally, each of the multiple sub-files includes an order identifier indicative of an order of the sub-file in the data file.

The slave push node 103 is further configured to merge the multiple downloaded sub-files based on the order identifier of the multiple downloaded sub-files.

Optionally, the slave push node 103 is further configured to push the data file obtained by the merging to the destination node 106 and continuously downloading the remaining sub-files, when the scheduling instruction is received and not all of the sub-files of the data file have been downloaded.

Any combination of all the above optional technical solutions can be used to form an optional embodiment of the present disclosure, which is not described herein.

Figure 2:
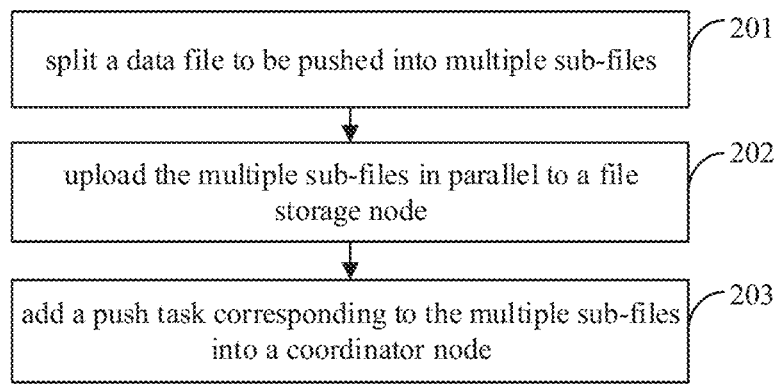
FIG. 2 is a flow chart of a method for pushing a file according to an embodiment of the present disclosure.

FIG. 2 is a flow chart of a method for pushing a file according to an embodiment of the present disclosure. The embodiment of the present disclosure is executed by a client. Reference is made to FIG. 2. The method includes steps 201 to 203.

In step 201, a data file to be pushed is split into multiple sub-files.

In step 202, the multiple sub-files are uploaded in parallel to a file storage node.

In step 203, a push task corresponding to the multiple sub-files is added into a coordinator node, and the coordinator node determines a destination node of the data file, based on the push task. When it is detected that the push task is added into the coordinator node, a slave push node downloads the multiple sub-files in parallel from the file storage node, merges the multiple downloaded sub-files, and pushes a data file obtained by the merging to the destination node upon receipt of a scheduling instruction.

Specifically, in step 203, the push task corresponding to the multiple sub-files is added into the coordinator node, and the coordinator node determines the destination node of the data file based on the push task. When it is detected that the push task is added into the coordinator node, the slave push node determines the destination node of the data file, downloads the multiple sub-files in parallel from the file storage node, merges the multiple downloaded sub-files, and pushes a data file obtained by the merging to the destination node upon receipt of the scheduling instruction.

Based on the method according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved.

Optionally, the uploading the multiple sub-files in parallel to the file storage node includes:

uploading the multiple sub-files in parallel to a specified directory of the file storage node, where the slave push node downloads the multiple sub-files in parallel from the specified directory.

Optionally, the uploading the multiple sub-files in parallel to the file storage node includes:

creating an uploading sub-task for each of the multiple sub-files, where each uploading sub-task includes a name of the corresponding sub-file; and uploading the multiple sub-files to the file storage node based on the multiple created uploading sub-tasks.

Optionally, each of the multiple sub-files includes an order identifier indicative of an order of the sub-file in the data file.

Any combination of all the above optional technical solutions can be used to form an optional embodiment of the present disclosure, which is not described herein.

Figure 3:
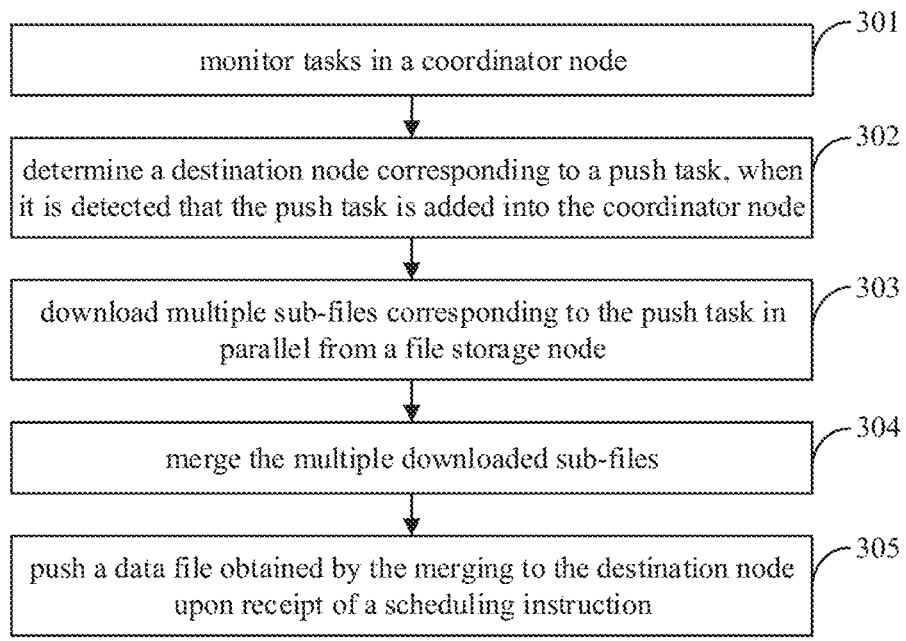
FIG. 3 is a flow chart of a method for pushing a file according to an embodiment of the present disclosure.

FIG. 3 is a flow chart of a method for pushing a file according to an embodiment of the present disclosure. The embodiment of the present disclosure is executed by a slave push node. Reference is made to FIG. 3. The method includes steps 301 to 305.

In step 301, tasks in a coordinator node are monitored.

In step 302, a destination node corresponding to a push task is determined, when it is detected that the push task is added into the coordinator node.

In step 303, multiple sub-files corresponding to the push task are downloaded in parallel from a file storage node, where the multiple sub-files are obtained by a client by splitting a data file to be pushed.

In step 304, the multiple downloaded sub-files are merged.

In step 305, a data file obtained by the merging is pushed to the destination node upon receipt of a scheduling instruction.

Based on the method according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved.

Optionally, the method further includes:

pushing the data file obtained by the merging and continuously downloading the remaining sub-files, when the scheduling instruction is received and not all of the sub-files of the data file have been downloaded.

Optionally, the downloading the multiple sub-files in parallel from the file storage node includes:

obtaining a file path included in the push task; and downloading the multiple sub-files in parallel from a specified directory of the file storage node, in a case that the file path is the specified directory of the file storage node.

Optionally, each of the multiple sub-files includes an order identifier indicative of an order of the sub-file in the data file. The merging the multiple downloaded sub-files includes:

merging the multiple downloaded sub-files based on the order identifiers of the multiple downloaded sub-files.

Any combination of all the above optional technical solutions can be used to form an optional embodiment of the present disclosure, which is not described herein.

Figure 4:
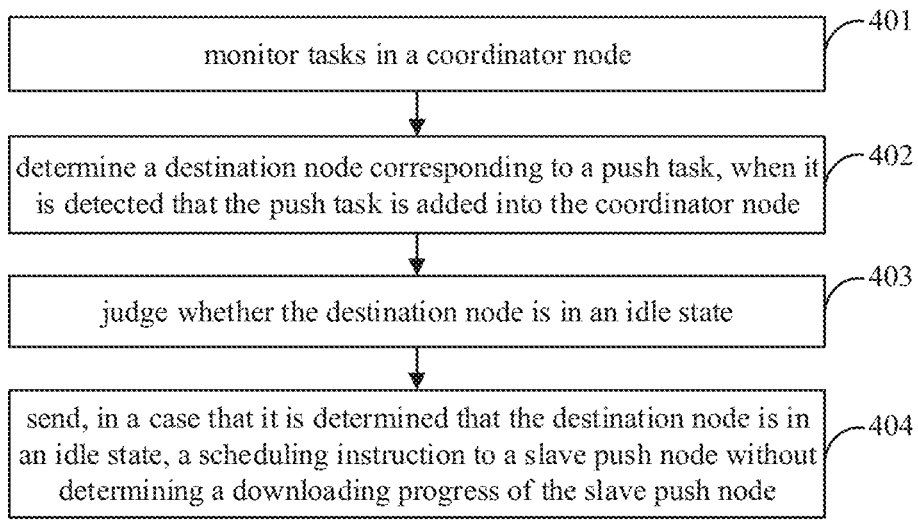
FIG. 4 is a flow chart of a method for pushing a file according to an embodiment of the present disclosure.

FIG. 4 is a flow chart of a method for pushing a file according to an embodiment of the present disclosure. The embodiment of the present disclosure is executed by a master push node. Reference is made to FIG. 4. The method includes steps 401 to 404.

In step 401, tasks in a coordinator node are monitored.

In step 402, a destination node corresponding to a push task is determined, when it is detected that the push task is added into the coordinator node.

In step 403, whether the destination node is in an idle state is judged.

In step 404, in a case that it is determined that the destination node is in an idle state, a scheduling instruction is sent to a slave push node without determining a downloading progress of the slave push node, to instruct the slave push node to push a data file to the destination node upon receipt of the scheduling instruction, where the data file is obtained by the slave push node by downloading multiple sub-files corresponding to the push task and merging the multiple downloaded sub-files.

Based on the method according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved. In a case that it is determined that the destination node is in an idle state, a master push node starts scheduling, regardless of whether the slave push node has downloaded all the sub-files of the data file. In such way, the slave push node obtains a data file obtained by the merging and pushes the same to the destination node. Therefore, a time interval from the moment when the destination node is in an idle state to the moment when the master push node sends a scheduling instruction is shortened, and the push efficiency is further improved.

Figure 5:
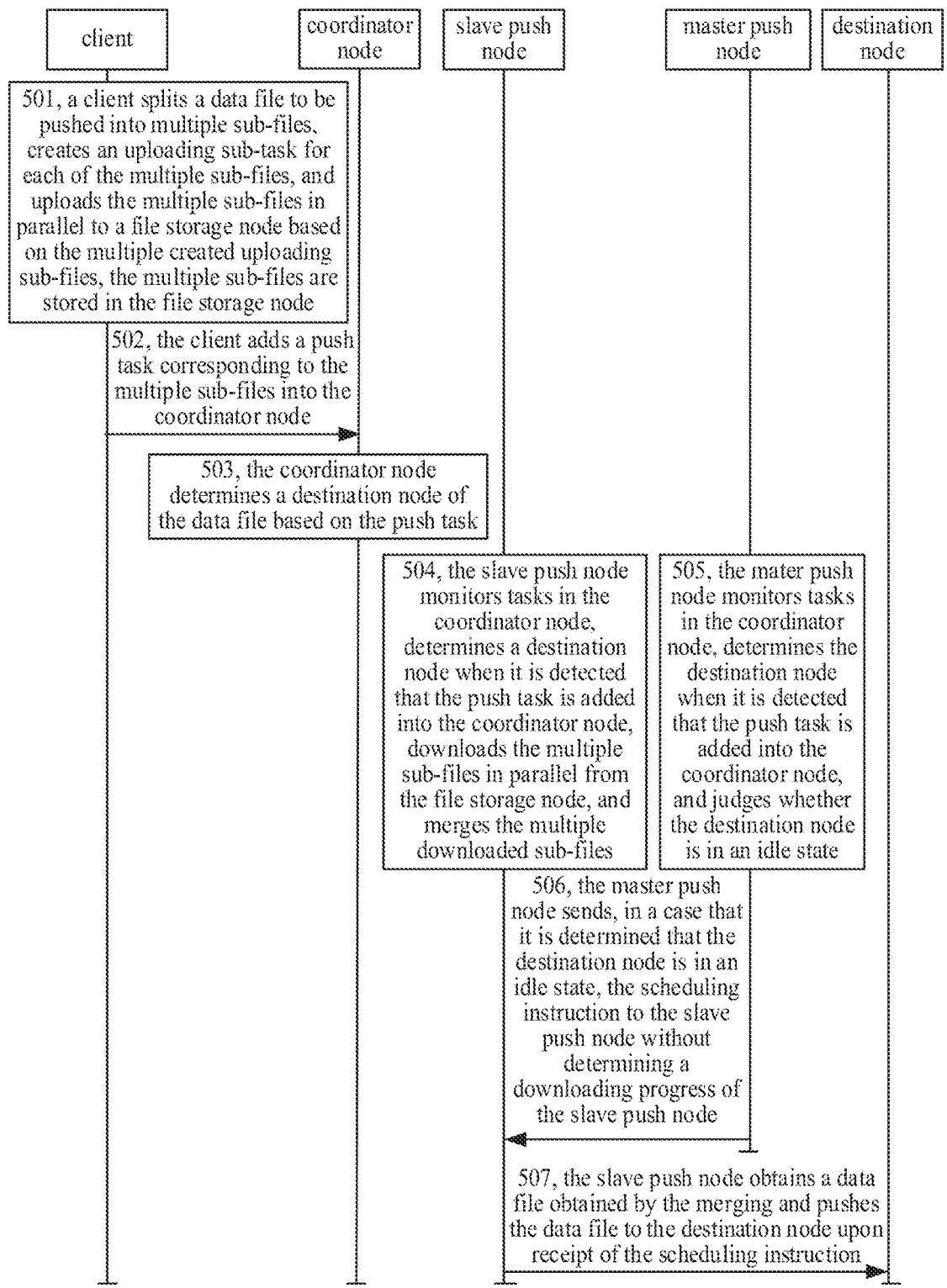
FIG. 5 is a flow chart of a method for pushing a file according to an embodiment of the present disclosure.

FIG. 5 is a flow chart of a method for pushing a file according to an embodiment of the present disclosure. Interaction bodies of the embodiment of the present disclosure are a client, a master push node, a slave push node, a coordinator node and a destination node. Reference is made to FIG. 5. The method includes steps 501 to 505.

In step 501, a client splits a data file to be pushed into multiple sub-files, creates an uploading sub-file for each of the multiple sub-files, and uploads the multiple sub-files in parallel to a file storage node, based on the multiple created uploading sub-files. The multiple sub-files are stored in the file storage node.

The data file to be pushed obtained by the client may be generated by the client, or may also be generated by other client and sent to the client, which is not limited in the embodiment of the present disclosure.

In the embodiment of the present disclosure, the client pushes the data file to a destination node. The destination node is a node which will use data in the data file, and the data file may be used for processing service content of the destination node.

For example, the destination node may be a node integral to an advertisement referral system, the data file is model data file, and model data in the model data file may be used to predict a recommendation algorithm in the advertisement recommendation system. If the destination node obtains the model data file, the advertisement recommendation system may load the model data file and predict the recommendation algorithm based on the model data file.

In practice, the destination node often uses external data. The external data generally needs to maintain strong consistency, and it is not easy for the external data to update incrementally. In order to facilitate the destination node to obtain the data, the data may be stored in the data file and then pushed to a destination node. In pushing the data file, the data file may be first uploaded to the file storage node for storing, and then pushed to the destination node from the file storage node. The file storage node is configured to store data files, and may be HDFS (Hadoop Distributed File System) or other nodes, which is not limited in the embodiment of the present disclosure.

In an embodiment of the present disclosure, in order to shorten the push time and improve the push efficiency, when obtaining the data file, the client does not directly upload the data file to the file storage node, but splits the data file into multiple sub-files, and uploads the multiple sub-files to a file storage node. The multiple sub-files are stored in the file storage node.

The number of sub-files obtained by splitting the data file may be determined in advance by the client, or may be determined by the client based on a total data volume of the data file and a pre-set data volume of each sub-file, which is not limited in the embodiment of the present disclosure. For the multiple sub-files obtained by splitting, the data volumes of different sub-files may be the same or not the same, which is not limited in the embodiment of the present disclosure. In addition, in order to facilitate subsequent merging of the multiple sub-files in sequence, each of the multiple sub-files may include an order identifier indicative of an order of the sub-file in the data file. The order identifier of each of the multiple sub-files may be stored in the sub-file, or added to a name of the sub-file, which is not limited in the embodiment of the present disclosure. For example, the client splits the data file into multiple sub-files, generates an order identifier corresponding to each of the multiple sub-files based on the order of the sub-file in the data file, and adds the order identifier to the name of the sub-file.

After splitting the data file into the multiple sub-files, the client may create a corresponding uploading sub-task for each of the multiple sub-files, and upload the multiple sub-files in parallel to a file storage node based on the multiple created uploading sub-tasks. The file storage node stores the multiple sub-files. The uploading sub-task may include a name of the corresponding sub-file. The client may determine the sub-files to be uploaded according to the file names of the uploading sub-tasks, and upload the sub-files to the file storage node.

Further, in creating a corresponding uploading sub-task for each of the sub-files, the client may add the multiple created uploading sub-tasks to a task queue. The client may create multiple threads, and each of the threads is used to process each of uploading sub-tasks. Multiple threads extract corresponding uploading sub-tasks in parallel from the task queue, process the uploading sub-tasks in parallel, and upload the sub-files corresponding to the file names included in the uploading sub-tasks to the file storage node.

Since the data volume of each sub-file is smaller than that of the data file, the time taken to upload the multiple sub-files in parallel is less than the time taken to upload the data file, that is, the time taken to upload the data file is shortened.

Further, the client may create a specified directory for the data file in the file storage node, and upload the multiple sub-files in parallel to the specified directory of the file storage node, so that the multiple sub-files are stored in the same directory, to facilitate subsequent downloading of the multiple sub-files. A name of the specified directory may be determined according to the timestamp when the client creates the specified directory. Each time when the client is to upload the data file, the client creates the specified directory in the file storage node according to the current timestamp, and uploads the multiple sub-files of the data file in parallel to the specified directory. The file storage node may include multiple specified directories. Different specified directories correspond to data files uploaded by the client at different times, and each of the specified directories includes multiple sub-files of the corresponding data file.

It should be noted that the embodiment of the present disclosure is described only by taking an example that the client splits the data file into multiple sub-files. In fact, for different data files, the client may or may not split the data file. Optionally, the client obtains a data volume of the data file. In a case that it is determined that the data volume of the data file is larger than a pre-set data volume, it indicates that the data file is so large that it may take a long time to upload the data file, and the client splits the data file into multiple sub-files and uploads the multiple sub-files in parallel. In a case that it is determined that the data volume of the data file is not larger than the pre-set data volume, it indicates that it will not take a long time to upload the data file, and the client does not need to split the data file, but directly uploads the data file to a file storage node. The pre-set data volume may be determined by the client in advance, which is not limited in the embodiment of the present disclosure.

In step 502, the client adds a push task corresponding to the multiple sub-files into the coordinator node.

The system for pushing a file according to the embodiment of the present disclosure not only includes a client, a destination node and a file storage node, but also includes a coordinator node, a slave push node, and a master push node. The coordinator node is configured to manage and coordinate push tasks in the file pushing system, and may be a zookeeper (distributed coordination service) node, or other coordinator nodes. The slave push node is configured to monitor tasks in the coordinator node, download a data file corresponding to the push task in the coordinator node, and push the downloaded data file to the destination node. The master push node is configured to monitor the tasks in the coordinator node and an operating state of the destination node, and schedule the slave push node in a case that the destination node is in an idle state, so that the slave push node downloads the file to be pushed.

To facilitate the slave push node to download the multiple sub-files, after uploading the multiple sub-files in parallel to the file storage node, the client creates a push task for the multiple sub-files, and adds the push task into the coordinator node. The push task may include a specified directory for storing the multiple sub-files. The slave push node may determine the specified directory based on the push task, and download the multiple sub-files from the specified directory.

In addition, after adding the push task, the client may further generate an uploading log and store the uploading log in a database. The uploading log includes uploading records of the multiple sub-files, such as the uploading time and the uploading specified directory, which is not limited in the embodiment of the present disclosure.

Figure 6A:
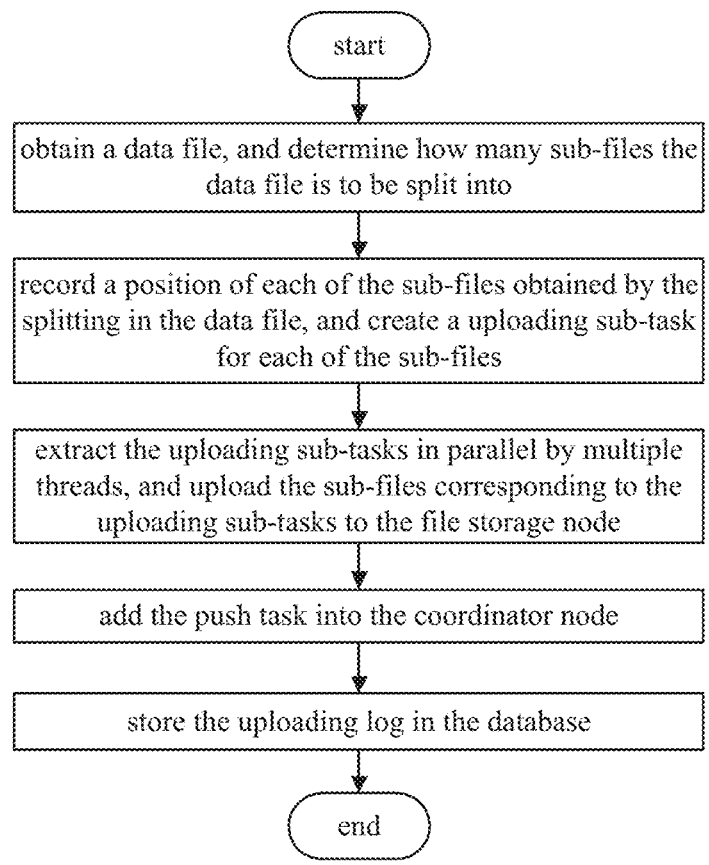
FIG. 6A is a schematic diagram of a processing flow of a client according to an embodiment of the present disclosure.

The processing steps of the client may be as shown in FIG. 6A. Reference is made to FIG. 6A. The client obtains a data file, and determines how many sub-files the data file is to be split into; records a position of each of the sub-files obtained by splitting in the data file, and creates an uploading sub-task for each of the sub-files; extracts the uploading sub-tasks in parallel by multiple threads, and uploads the sub-files corresponding to the uploading sub-tasks to the file storage node; adds the push task into the coordinator node; and stores the uploading log in the database.

It should be noted that the client may or may not split the data file. In such way, a file uploaded by the client may be a data file, or multiple sub-files obtained by dividing the data file. To facilitate the slave push node to determine a file to be downloaded, the push task added by the client into the coordinator node may include a corresponding file path. In the subsequent process, the slave push node may download a file corresponding to the push task based on the file path. In a case that the client does not split the data file, a file path included in the push task is a path of the data file, and the slave push node may download a data file corresponding to the file path. In a case that the client has split the data file, the file path included in the push task is the specified directory storing the multiple sub-files of the data file, and the slave push node may download multiple sub-files corresponding to the file path, that is, the multiple sub-files under the specified directory.

In step 503, the coordinator node determines a destination node of the data file based on the push task, and the process proceeds to steps 504 and 505.

If the push task is added into the coordinator node, the coordinator node may determine the destination node of the data file based on the multiple sub-files corresponding to the push task. Optionally, the coordinator node may set configuration management information in advance, and determine the destination node of the data file based on the configuration management information and the data file.

For example, the configuration management information includes a destination node address corresponding to a type of the data file. When obtaining the push task, the coordinator node determines the type of the data file corresponding to the push task, and determines the destination node address of the data file based on the type of the data file and the configuration management information. Therefore, a destination node of the data file is determined. Alternatively, the configuration management information may include a destination node address corresponding to geographic location information of the data file, i.e., the coordinator node splits the data file in accordance with geographic regions, and pushes data files located in different geographic regions to different destination nodes. When obtaining the push task, the coordinator node determines the geographic location information of the data file corresponding to the push task, and determines the destination node address of the data file based on the geographic location information of the data file and the configuration management information. The method for determining a destination node by the coordinator node is not limited in the embodiment of the present disclosure.

In step 504, the slave push node monitors tasks in the coordinator node, determines the destination node when it is detected that the push task is added into the coordinator node, downloads the multiple sub-files in parallel from a file storage node, and merges the multiple downloaded sub-files.

The slave push node monitors tasks in the coordinator node, and may determine the destination node corresponding to the push task, i.e., the destination node of the data file, when it is detected that the push task is added into the coordinator node. The slave push node may receive a destination node address sent by the coordinator node, and determine the destination node based on the destination node address.

After determining the destination node, the slave push node downloads the multiple sub-files in parallel from the file storage node, and merges the multiple downloaded sub-files. In the merging, the slave push node determines the order of the multiple downloaded sub-files based on the order identifiers of the multiple downloaded sub-files, and merges the multiple sub-files in order of the multiple sub-files.

In practice, a file uploaded by the client may be a data file, or multiple sub-files obtained by dividing the data file, and the file path included in the push task may be a path of the data file, or the specified directory for storing multiple sub-files. The slave push node monitors tasks in the coordinator node. When it is detected that a push task is added into the coordinator node, the slave push node obtains the file path included in the push task, and judges whether the file path is a path of a file or a directory. In a case that the file path is a path of a file, the slave push node downloads a file corresponding to the push task from the file storage node. In a case that the file path is a directory, the slave push node downloads the multiple sub-files stored in the directory in parallel from the file storage node.

Further, when it is detected that a push task is added into the coordinator node, the slave push node allocates a first shared memory for the push task, and judges whether the file path in the push task is a directory or a path of a file. In a case that the file path in the push task is a path of a file, the slave push node downloads a file corresponding to the push task from the file storage node and stores the same in the first shared memory. In a case that the file path in the push task is a directory, the slave push node divides the allocated first shared memory to obtain multiple second share memories. In this case, the slave push node creates corresponding downloading tasks for the multiple sub-files in the directory, adds the multiple downloading tasks into a downloading task queue, downloads the multiple sub-files in parallel from the file storage node based on the downloading task queue, selects a second shared memory corresponding to an order of each of the sub-files based on the order of the sub-file in the data file and the offset of each of the second share memories, and stores the sub-file into the corresponding second shared memory.

Figure 6B:
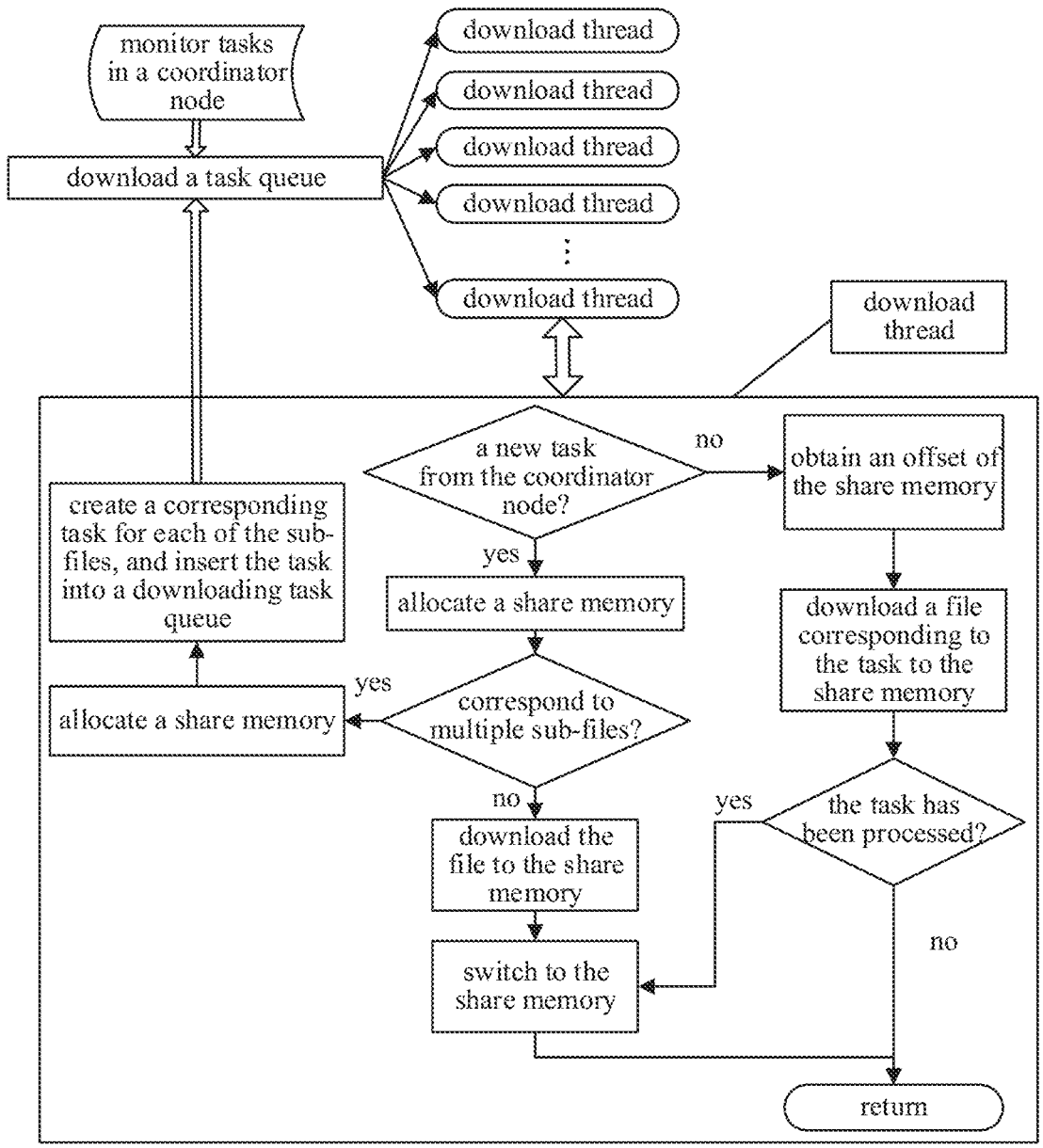
FIG. 6B is a schematic diagram of a processing flow of a slave push node according to an embodiment of the present disclosure.

The processing steps of the slave push node may be as shown in FIG. 6B. Reference is made to FIG. 6B. The slave push node includes a downloading task queue and multiple downloading threads, and each of the downloading threads is configured to process a task in the downloading task queue. When it is monitored that a push task is added into the coordinator node, the slave push node adds the task into the downloading task queue, and the downloading thread extracts the task from the downloading task queue and may determine whether the extracted task is a new task from the coordinator node. In a case that the task is a new task from the coordinator node, the slave push node allocates a shared memory for the new task and judges whether a file path in the task is a directory. In a case that it is determined that the file path in the task is a directory, the slave push node divides the allocated shared memory to obtain multiple share memories, and the multiple share memories are respectively configured to store multiple sub-file corresponding to the task. The downloading thread creates a corresponding downloading task for each of the multiple sub-files, and inserts the same into the downloading task queue. In the subsequent process, when judging whether a downloading task is a new task from the coordinator node, the downloading thread may determine that the loading task is not a new task from the coordinator node but a task generated by the downloading thread, the downloading thread obtains the offset allocated for the shared memory, and downloads a sub-file corresponding to the downloading task to the shared memory based on the offset.

In addition, the push task may further include a pre-set format for specifying a format to which a name of a file to be downloaded should conform. File paths and the pre-set format in the push task may be saved in the coordinator node. When detecting the push task, the slave push node may obtain the file path and the pre-set format, and download a file with a file name matching the pre-set format from the file path, rather than a file with a file name not matching the pre-set format.

The pre-set format may be determined based on a naming rule of a sub-file to be pushed, or may be self-defined, which is not limited in the embodiment of the present disclosure.

For example, a name of each of the sub-files in the file storage node is determined according to the uploading tine, and the pre-set format may be determined according to the uploading tine of the sub-file to be pushed. If the pre-set format is "20150601 . . . ", it indicates that only sub-files uploaded in Jun. 1, 2015 need to be downloaded, and the slave push node downloads sub-files matching the pre-set format "20150601 . . . " from the file path, that is, the sub-files uploaded in Jun. 1, 2015.

In step 505, the mater push node monitors tasks in the coordinator node, determines the destination node when it is detected that the push task is added into the coordinator node, and judges whether the destination node is in an idle state.

The mater push node monitors the tasks in the coordinator node, and may determine a destination node corresponding to the push task, that is, a destination node of the data file, when it is detected that the push task is added into the coordinator node. The master push node may receive a destination node address sent by the coordinator node, and determine the destination node based on the destination node address.

In the process of pushing, the destination node may process the service content. If the multiple sub-files are pushed to the destination node, a bandwidth of the destination node is occupied, which tends to affect the normal processing of the service content. To avoid affecting the processing of the service content, the master push node may further monitor an operating state of the destination node, and judge whether the destination node is in a busy state or an idle state. In a case that it is determined that the destination node is in an idle state, the master push node starts scheduling and sends a scheduling instruction to the slave push node, so that the slave push node pushes the data file to the destination node. In a case that it is determined that the destination node is in a busy state, the master push node may not send a scheduling instruction to the slave push node and may not start scheduling, thus, the slave push node may not push the data file to the destination node.

The master push node may obtain a bandwidth occupied by the current service content of the destination node, and determine the operating state of the destination node based on the bandwidth occupied by the current service content of the destination node. In a case that the bandwidth occupied by the current service content of the destination node is wider than a pre-set threshold, the master push node determines that the destination node is in a busy state, and in a case that the bandwidth occupied by the current service content of the destination node is not wider than the pre-set threshold, the master push node determines that the destination node is in an idle state. Alternatively, in a case that a ratio between the bandwidth occupied by the current service content of the destination node and a total bandwidth of the destination node is greater than a pre-set ratio, the master push node determines that the destination node is in a busy state, and in a case that a ratio between the bandwidth occupied by the current service content of the destination node and a total bandwidth of the destination node is not greater than the pre-set ratio, the master push node determines that the destination node is in an idle state.

It should be noted that there is no definite timing relationship between step 504 and step 505. Step 504 and step 505 may be performed at the same time or one after the other. That is, step 504 may be performed before or after step 505, which is not limited in the embodiment of the present disclosure.

In addition, it should be noted that a system for pushing a file includes multiple push nodes. Since the number of push nodes may be large, a master push node may be selected from the multiple push nodes and the other push nodes are determined as slave push nodes, to avoid collisions among the push nodes. The slave push nodes are configured to execute specific tasks of pushing data files, and the master push node is configured to schedule the push process of the slave push node. The master push node may be determined by randomly selecting, or may be determined by the coordinator node. The master push node may be changed during operating, which is not limited in the embodiment of the present disclosure.

In step 506, the master push node sends, in a case that it is determined that the destination node is in an idle state, the scheduling instruction to the slave push node without determining a downloading progress of the slave push node.

In step 507, the slave push node obtains a data file obtained by the merging and pushes the data file obtained to the destination node upon receipt of the scheduling instruction.

In the conventional technology, the master push node may monitor the operating state of the destination node and the downloading progress of the slave push node. The master push node sends a scheduling instruction to the slave push node, only when the destination node is in an idle state and the slave push node completes the downloading of the data file. When the destination node starts in an idle state, the master push node needs to wait for the slave push node to complete the downloading of the data file, and the waiting time may be long. That is, a time interval from the moment when the destination node starts in an idle state to the moment when the master push node sends a scheduling instruction is long.

However, in the embodiment of the present disclosure, the master push node sends a scheduling instruction to the slave push node in a case that it is determined that the destination node is in an idle state, and there is no need to determine the downloading process of the slave push node, that is, whether or not the slave push node has downloaded all the sub-files of the data file. Upon receipt of the scheduling instruction, the slave push node obtains a data file obtained by the merging and pushes the same to the destination node, and the destination node receives the data file pushed by the slave push node.

The master push node shortens the time interval from the moment when the destination node starts in an idle state to the moment when the master push node sends a scheduling instruction, and sends the scheduling instruction to the slave push node without waiting that all the sub-files of the data file have been downloaded. In such way, the slave push node starts to push the data file to the destination node in response to the scheduling instruction. Therefore, the push time is shortened, and the push efficiency is improved.

The slave push node may receive the scheduling instruction from the master push node in a case that not all of the multiple files have been downloaded. In this case, the slave push node may continuously download and merge the remaining sub-files obtained by splitting the data file, while pushing the data file obtained by the merging to the destination node, which achieves the simultaneous performing of downloading and pushing. Therefore, the time taken to push a data file is shortened.

Optionally, the slave push node may download the multiple sub-files of the data file in parallel via a downloading thread, and push the data file obtained by the merging to the destination node via a pushing thread. The downloading thread and the pushing thread may operate in parallel.

Figure 6C:
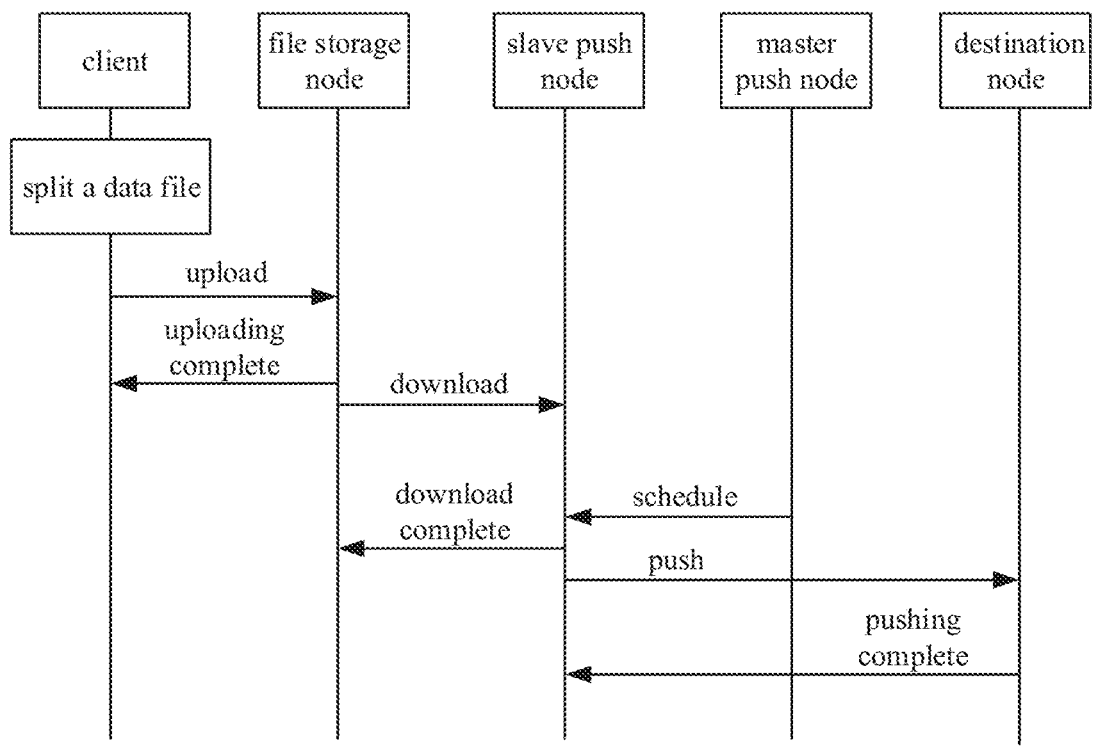
FIG. 6C is a schematic diagram of an interacting sequence according to an embodiment of the present disclosure.

In an embodiment of the present disclosure, an interacting sequence diagram among a client, a file storage node, a master push node, a slave push node and a destination node may be as shown in FIG. 6C. Reference is made to FIG. 6C. The client splits a data file into multiple sub-files and uploads the multiple sub-files to the file storage node. The slave push node downloads the multiple sub-files from the file storage node. The master push node sends a scheduling instruction to the slave push node. The slave push node pushes a data file obtained by the merging the downloaded sub-files to the destination node. The slave push node may receive the scheduling instruction, when all of the multiple sub-files have been downloaded, or when not all of the multiple sub-files have been downloaded. FIG. 6C takes an example that the slave push node receives the scheduling instruction, when not all of the multiple sub-files have been downloaded.

Compared to the conventional technology, the method according to the embodiment of the present disclosure may shorten the time taken to upload, download, schedule and push a data file. Advantages are described below.

(1) In the conventional technology, data to be pushed is stored in a data file, and the data file is uploaded to the file storage node in a form of a single file, which results in a long time taken to upload to data file. In the embodiment of the present disclosure, when stored in a data file, the data to be pushed is split to obtain multiple sub-files, and the multiple sub-files are uploaded in parallel to the file storage node, which shortens the time taken to upload to data file.

(2) In the conventional technology, after the data file is uploaded to the file storage node, the time taken to download the data file is long. In the embodiment of the present disclosure, after the multiple sub-files are uploaded in parallel to the file storage node, the multiple sub-files are downloaded in parallel, which shortens the time taken to download the data file.

(3) In the conventional technology, the master push node will start scheduling, only when the destination node is in an idle state and all data in the data file is downloaded from the push node. In the embodiment of the present disclosure, the master push node start the scheduling, in a case that it is determined that the destination node is in an idle state, without requiring the slave push node to download all the sub-files, which shortens a time interval from the moment when the destination node is in an idle state to the moment when the master push node sends a scheduling instruction.

(4) In the conventional technology, the slave push node will not push the data file to the destination node, until the slave push node downloads all the data in the data file. Therefore, the push time is long. In the embodiment of the present disclosure, the slave push node starts to push the downloaded data file to the destination node, when the slave push node has not downloaded all the multiple sub-files obtained by splitting the data file. The process of downloading and the process of pushing can be performed simultaneously, which shortens the time taken to push a data file.

Based on the method according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved. In a case that it is determined that the destination node is in an idle state, a master push node starts scheduling, regardless of whether the slave push node has downloaded all the sub-files of the data file. In such way, the slave push node obtains a data file obtained by the merging and pushes the same to the destination node. Therefore, a time interval from the moment when the destination node is in an idle state to the moment when the master push node sends a scheduling instruction is shortened, and the push efficiency is further improved.

Figure 7:
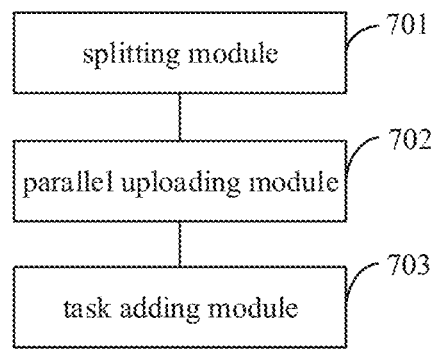
FIG. 7 is a schematic structural diagram of a device for pushing a file according to an embodiment of the present disclosure.

FIG. 7 is a schematic structural diagram of a device for pushing a file according to an embodiment of the present disclosure. Reference is made to FIG. 7. The device includes a splitting module 701, a parallel uploading module 702 and a task adding module 703.

The splitting module 701 is configured to split a data file to be pushed into multiple sub-files.

The parallel uploading module 702 is configured to upload the multiple sub-files in parallel to a file storage node.

The task adding module 703 is configured to add a push task corresponding to the multiple sub-files into a coordinator node. When it is detected that the push task is added into the coordinator node, a slave push node downloads the multiple sub-files in parallel from the file storage node, merges the multiple downloaded sub-files, and pushes a data file obtained by the merging to a destination node upon receipt of a scheduling instruction.

The task adding module 703 is configured to add the push task corresponding to the multiple sub-files into a coordinator node. The coordinator node determines a destination node of the data file based on the push task. When it is detected that the push task is added into the coordinator node, the slave push node determines the destination node of the data file, downloads the multiple sub-files in parallel from the file storage node, merges the multiple downloaded sub-files, and pushes a data file obtained by the merging to the destination node upon receipt of the scheduling instruction.

Based on the device according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved.

Optionally, the parallel uploading module 703 is configured to upload the multiple sub-files in parallel to a specified directory of the file storage node. The slave push node downloads the multiple sub-files in parallel from the specified directory.

Optionally, the parallel uploading module 703 is further configured to create an uploading sub-task for each of the multiple sub-files, and upload the multiple sub-files in parallel to the file storage node.

Optionally, each of the multiple sub-files includes an order identifier indicative of an order of the sub-file in the data file.

Any combination of all the above optional technical solutions can be used to form an optional embodiment of the present disclosure, which is not described herein.

Figure 8:
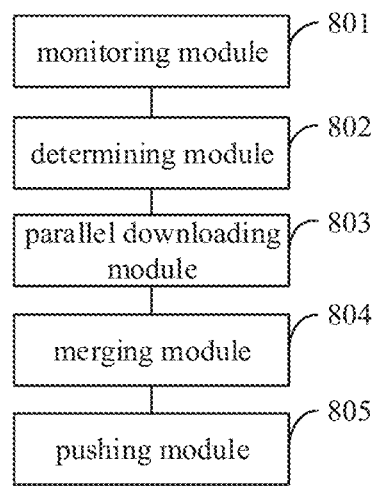
FIG. 8 is a schematic structural diagram of a device for pushing a file according to an embodiment of the present disclosure.

FIG. 8 is a schematic structural diagram of a device for pushing a file according to an embodiment of the present disclosure. Reference is made to FIG. 8. The device includes a monitoring module 801, a determining module 802, a parallel downloading module 803, a merging module 804 and a pushing module 805.

The monitoring module 801 is configured to monitor tasks in a coordinator node.

The determining module 802 is configured to determine a destination node corresponding to a push task, when it is detected that the push task is added into the coordinator node.

The parallel downloading module 803 is configured to download multiple sub-files corresponding to the push task in parallel from a file storage node, where the multiple sub-files is obtained by a client by splitting a data file to be pushed.

The merging module 804 is configured to merge the multiple downloaded sub-files.

The pushing module 805 is configured to push a data file obtained by the merging to the destination node upon receipt of a scheduling instruction.

Based on the device according to the embodiment of the present disclosure, if a data file is to be pushed to a destination node, the data file is split into multiple sub-files, and the multiple sub-files are uploaded to a file storage node in parallel, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved.

Optionally, the parallel downloading module 803 is further configured to push the data file obtained by the merging to the destination node and continuously download the remaining sub-files, when the scheduling instruction is received, and not all of the sub-files of the data file have been downloaded.

Optionally, the parallel downloading module 803 is further configured to obtain a file path included in the push task, and download the multiple sub-files in parallel from the specified directory of the file storage node, in a case that the file path is the specified directory of the file storage node.

Optionally, each of the multiple sub-files includes an order identifier indicative of an order of the sub-file in the data file.

The merging module 804 is further configured to merge the multiple downloaded sub-files based on the downloaded order identifiers of the multiple sub-files.

Any combination of all the above optional technical solutions can be used to form an optional embodiment of the present disclosure, which is not described herein.

Figure 9:
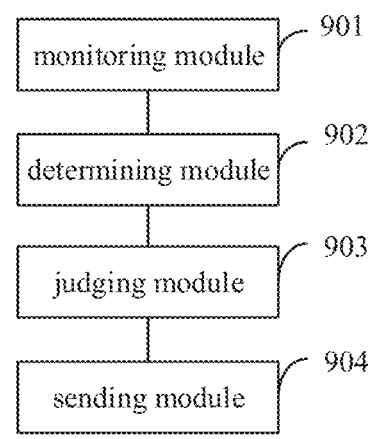
FIG. 9 is a schematic structural diagram of a device for pushing a file according to an embodiment of the present disclosure.

FIG. 9 is a schematic structural diagram of a device for pushing a file according to an embodiment of the present disclosure. Reference is made to FIG. 9. The device includes a monitoring module 901, a determining module 902, a judging module 903 and a sending module 904.

The monitoring module 901 is configured to monitor tasks in a coordinator node.

The determining module 902 is configured to determine a destination node corresponding to a push task, when it is detected that the push task is added into the coordinator node.

The judging module 903 is configured to judge whether the destination node is in an idle state.

The sending module 904 is configured to send, in a case that it is determined that the destination node is in an idle state, a scheduling instruction to a slave push node without determining a downloading progress of the slave push node, to instruct the slave push node to push a data file to the destination node upon receipt of the scheduling instruction. The data file is obtained by the slave push node by downloading multiple sub-files corresponding to the push task and merging the multiple downloaded sub-files.

Based on the device according to the embodiment of the present disclosure, if a client wants to push a data file to a destination node, the client splits the data file into multiple sub-files, uploads the multiple sub-files in parallel to a file storage node, which shortens the time taken to upload the data file, and adds a push task corresponding to the multiple sub-files into the coordinator node. In such way, a slave push node can download the multiple sub-files in parallel from the file storage node based on the push task, which shortens the time taken to download the data file. Therefore, the push efficiency is improved. In a case that it is determined that the destination node is in an idle state, a master push node starts scheduling, regardless of whether the slave push node has downloaded all the sub-files of the data file. In such way, the slave push node obtains a data file obtained by the merging and pushes the same to the destination node. Therefore, a time interval from the moment when the destination node is in an idle state to the moment when the master push node sends a scheduling instruction is shortened, and the push efficiency is further improved.

It should be noted that, that a device for pushing a file according to the embodiments of the present disclosure push a file is described by taking an example that the above various function modules are split. In practice, the above functions can be performed by different functional modules as required, that is, internal structures of the client, the slave push node, and the master push node are split into different functional modules to perform all or part of the functions described in the above. In addition, the device for pushing a file according to the above embodiments belongs to the same concept of the method for pushing a file according to the above embodiments, which is not described herein.

It may be understood by those skilled in the art, all or part of steps implementing the above-described embodiments may be completed by hardware, or by hardware instructed by relevant program instructions, which can be stored in a computer readable storage medium. The above-mentioned storage medium may be a read-only memory, a disk or a CD etc.

A device for pushing a file is provided according to an embodiment of the present disclosure. The device includes a processor and a non-transient computer readable medium storing multiple instructions, which when executed, cause the processor to perform the following steps:

splitting a data file to be pushed into multiple sub-files;

uploading the multiple sub-files in parallel to a file storage node; and adding a push task corresponding to the multiple sub-files into a coordinator node, where when it is detected that the push task is added into the coordinator node, a slave push node downloads the multiple sub-files in parallel from the file storage node, merges the multiple downloaded sub-files, and pushes a data file obtained by the merging to a destination node upon receipt of a scheduling instruction.

Optionally, the uploading the multiple sub-files in parallel to the file storage node includes uploading the multiple sub-files in parallel to a specified directory of the file storage node, where the slave push node downloads the multiple sub-files in parallel from the specified directory.

Optionally, the uploading the multiple sub-files in parallel to the file storage node includes: creating uploading sub-tasks for all of the multiple sub-files, where each of the uploading sub-tasks includes a name of the corresponding sub-file; and uploading the multiple sub-files to the file storage node, based on the multiple created uploading sub-tasks.

Optionally, each of the multiple sub-files includes an order identifier indicative of an order of the sub-file in the data file.

A device for pushing a file is further provided according to an embodiment of the present disclosure. The device includes a processor and a non-transient computer readable medium storing multiple instructions, which when executed, cause the processor to perform the following steps:

monitoring tasks in a coordinator node;

determining a destination node corresponding to a push task, when it is detected that the push task is added into the coordinator node;

downloading multiple sub-files corresponding to the push task in parallel from a file storage node, where the multiple sub-files are obtained by a client by splitting a data file to be pushed;

merging the multiple downloaded sub-files; and pushing a data file obtained by the merging to the destination node upon receipt of a scheduling instruction.

Optionally, the downloading multiple sub-files corresponding to the push task in parallel from the file storage node includes: pushing the data file obtained by the merging to the destination node and continuously downloading the remaining sub-files, when the scheduling instruction is received and not all of the sub-files of the data file have been downloaded.

Optionally, each of the multiple sub-files includes an order identifier indicative of an order of the sub-file in the data file. The merging the multiple downloaded sub-files includes merging the multiple downloaded sub-files based on the order identifiers of the multiple downloaded sub-files.

A device for pushing a file is further provided according to an embodiment of the present disclosure. The device includes a processor and a non-transient computer readable medium storing multiple instructions, which when executed, cause the processor to perform the following steps:

monitoring tasks in a coordinator node;

determining a destination node corresponding to a push task, when it is detected that the push task is added into the coordinator node;

judging whether the destination node is in an idle state; and sending, in a case that it is determined that the destination node is in an idle state, a scheduling instruction to a slave push node without determining a downloading progress of the slave push node, to instruct the slave push node push a data file to the destination node upon receipt of the scheduling instruction, where the data file is obtained by the slave push node by downloading multiple sub-files corresponding to the push task and merging the multiple downloaded sub-files.

Figure 10:
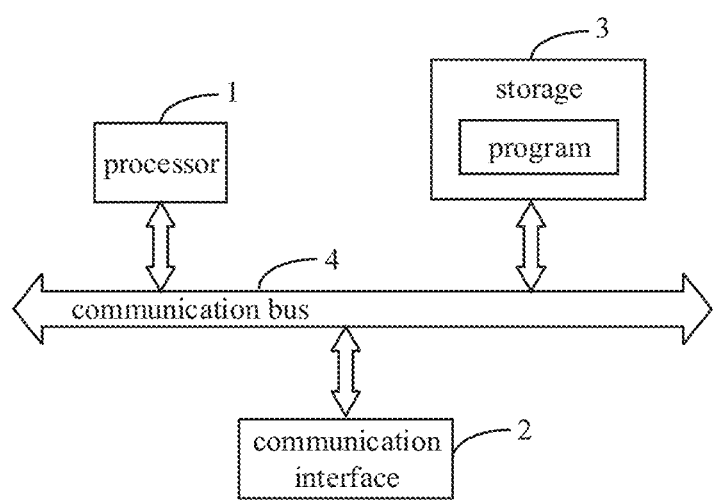
FIG. 10 is a hardware structural schematic diagram of a device for pushing a file according to an embodiment of the present disclosure.

Further, the device for pushing a file according to an embodiment of the present disclosure may be implemented in hardware. FIG. 10 is a hardware structural schematic diagram of a device for pushing a file according to an embodiment of the present disclosure. Referring to FIG. 10, the device for pushing a file may include a processor 1, a communication interface 2, a storage 3 and a communication bus 4.

The processor 1, the communication interface 2 and the storage 3 communicate with each other via the communication bus 4.

The processor 1 is configured to execute a program. The program may include program instructions, which are executed by the processor to perform the above methods.

The processor 1 may be a central processing unit CPU, or a specific ASIC (Application Specific Integrated Circuit), or one or more integrated circuits configured to implement embodiments of the present disclosure.

The storage 3 is configured to store the program, and may include a high speed RAM storage, and may also include a non-volatile memory, such as at least one disk storage.

The foregoing embodiments are only preferred embodiments of the disclosure and are not meant to limit the disclosure. All modifications, equivalent variations and improvements made without departing from the spirit and principle of the disclosure shall fall in the scope of the technical solutions of the disclosure.

The invention claimed is:

1. A method for pushing a file, comprising:

monitoring tasks in a coordinator node;

determining a destination node corresponding to a push task when it is detected that the push task is added into the coordinator node;

downloading a plurality of sub-files corresponding to the push task in parallel from a file storage node, wherein the plurality of sub-files are obtained by a client by splitting a data file to be pushed;

merging the downloaded sub-files; and pushing a data file obtained by the merging to the destination node upon receipt of a scheduling instruction, wherein the method further comprises continuously downloading and merging remaining sub-files of the plurality of sub-files while pushing a data file obtained by the merging to the destination node, when the scheduling instruction is received and not all of the sub-files of the data file have been downloaded, and wherein the method is performed by a processor.

2. The method according to claim 1, wherein downloading the plurality of sub-files corresponding to the push task in parallel from the file storage node comprises:

obtaining a file path comprised in the push task; and downloading the plurality of sub-files in parallel from a specified directory of the file storage node, in a case that the file path is the specified directory of the file storage node.

3. The method according to claim 1, wherein each of the plurality of sub-files comprises an order identifier indicative of an order of the sub-file in the data file, and merging the plurality of downloaded sub-files comprises:

merging the plurality of downloaded sub-files based on the order identifiers of the plurality of downloaded sub-files.

4. The method for pushing a file according to claim 1, wherein the processor is a processor of a slave push node;
wherein before the monitoring tasks in a coordinator node, the method comprises splitting, by a client, the data file to be pushed into the plurality of sub-files, uploading the plurality of sub-files in parallel to the file storage node, and adding the push task corresponding to the plurality of sub-files into the coordinator node; and wherein before the pushing a data file obtained by the merging to the destination node upon receipt of a scheduling instruction and after the merging the plurality of downloaded sub-files, the method comprises:

monitoring, by a master push node, the tasks in the coordinator node, determining the destination node corresponding to the push task when it is detected that the push task is added into the coordinator node, judging whether the destination node is in an idle state, and sending, in a case that it is determined that the destination node is in the idle state, the scheduling instruction to the slave push node without determining a downloading progress of the slave push node.

5. The method according to claim 4, wherein uploading the plurality of sub-files in parallel to the file storage node comprises:

uploading the plurality of sub-files in parallel to a specified directory of the file storage node, wherein the slave push node downloads the plurality of sub-files in parallel from the specified directory.

6. The method according to claim 4, wherein uploading the plurality of sub-files in parallel to the file storage node comprises:

creating an uploading sub-task for each of the plurality of sub-files, wherein each uploading sub-task comprises a name of the corresponding sub-file; and uploading the plurality of sub-files in parallel to the file storage node based on the plurality of created uploading sub-tasks.

7. The method according to claim 4, wherein each of the plurality of sub-files comprises an order identifier indicative of an order of the sub-file in the data file, and the merging the plurality of downloaded sub-files comprises:

merging the plurality of downloaded sub-files based on the order identifiers of the plurality of downloaded sub-files.

8. A device for pushing a file, comprising one or more processors and a memory for storing program instructions, wherein the one or more processors is configured to execute the program instructions to:

monitor tasks in a coordinator node;

determine a destination node corresponding to a push task when it is detected that the push task is added into the coordinator node;

download a plurality of sub-files corresponding to the push task in parallel from a file storage node, wherein the plurality of sub-files are obtained by a client by splitting a data file to be pushed;

merge the downloaded sub-files; and push a data file obtained by the merging to the destination node upon receipt of a scheduling instruction, wherein the one or more processors are further configured to execute the program instructions to continuously download and merge remaining sub-files of the plurality of sub-files while pushing a data file obtained by the merging to the destination node, when the scheduling instruction is received and not all of the sub-files of the data file have been downloaded.

9. The device according to claim 8, wherein the one or more processors are further configured to execute the program instructions to:

obtain a file path comprised in the push task; and download the plurality of sub-files in parallel from a specified directory of the file storage node, in a case that the file path is the specified directory of the file storage node.

10. The device according to claim 8, wherein each of the plurality of sub-files comprises an order identifier indicative of an order of the sub-file in the data file; and the one or more processors are further configured to executes the program instructions to merge the plurality of downloaded sub-files based on the order identifiers of the plurality of downloaded sub-files.

11. A system for pushing a file, comprising a client, a master push node, a slave push node comprising the device for pushing a file according to claim 8, a file storage node, a coordinator node and a destination node, wherein:

the client is configured to split the data file to be pushed into the plurality of sub-files, upload the plurality of sub-files in parallel to the file storage node, and add the push task corresponding to the plurality of sub-files into the coordinator node; and the master push node is configured to monitor the tasks in the coordinator node, determine the destination node corresponding to the push task when it is detected that the push task is added into the coordinator node, judge whether the destination node is in an idle state, and send, in a case that it is determined that the destination node is in the idle state, the scheduling instruction to the slave push node without determining a downloading progress of the slave push node.

12. The system according to claim 11, wherein the client is configured to upload the plurality of sub-files in parallel to the file storage node by:

uploading the plurality of sub-files in parallel to a specified directory of the file storage node, wherein the slave push node downloads the plurality of sub-files in parallel from the specified directory.

13. The system according to claim 11, wherein the client is configured to upload the plurality of sub-files in parallel to the file storage node by:

creating an uploading sub-task for each of the plurality of sub-files, wherein each uploading sub-task comprises a name of the corresponding sub-file; and uploading the plurality of sub-files in parallel to the file storage node based on the plurality of created uploading sub-tasks.

14. The system according to claim 11, wherein each of the plurality of sub-files comprises an order identifier indicative of an order of the sub-file in the data file, and the slave push node is configured to:

merge the plurality of downloaded sub-files based on the order identifiers of the plurality of downloaded sub-files.

* * * * *